May 18, 1965

W. B. KIRK 3,183,795

BRAKE CYLINDER ASSEMBLY

Filed Dec. 24, 1962

INVENTOR.
Walter B. Kirk
BY Ralph W. McIntire
Attorney

May 18, 1965    W. B. KIRK    3,183,795
BRAKE CYLINDER ASSEMBLY
Filed Dec. 24, 1962    2 Sheets-Sheet 2
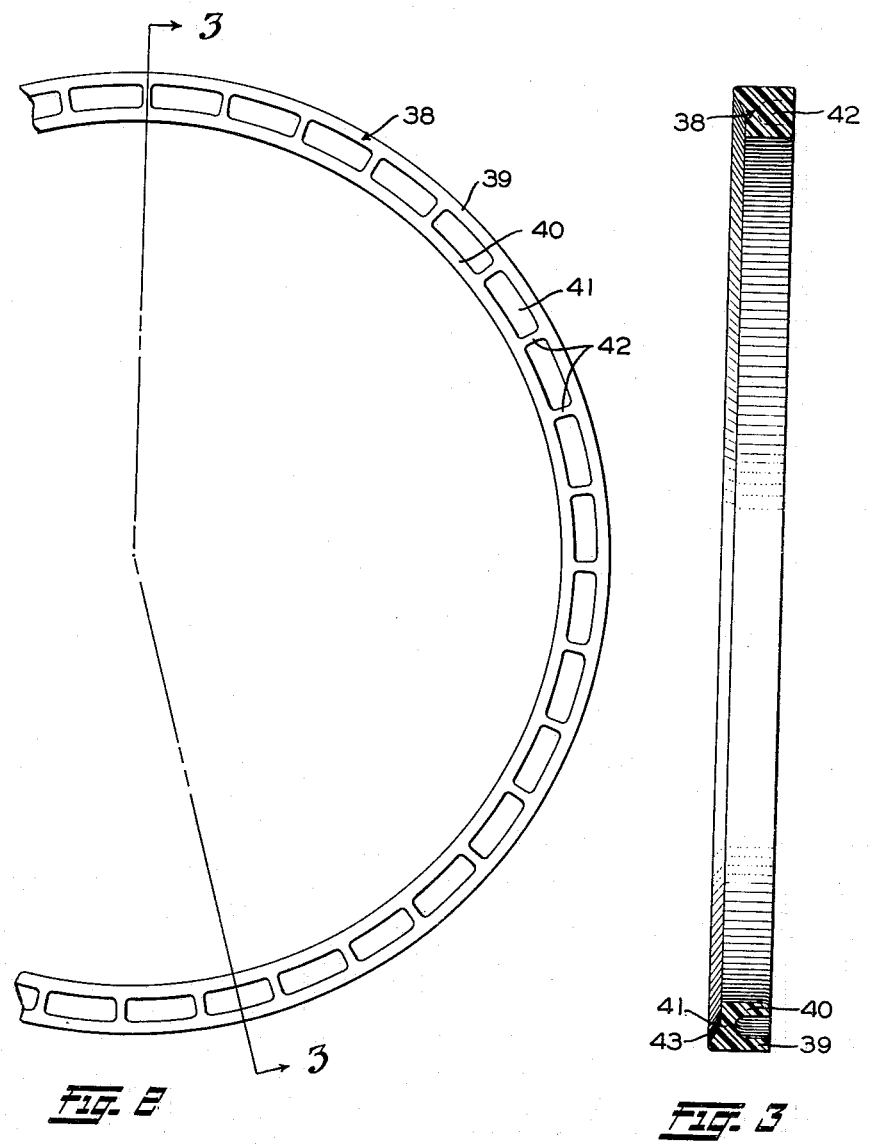
INVENTOR.
Walter B. Kirk
BY Ralph W. McIntire
Attorney

United States Patent Office 3,183,795
Patented May 18, 1965

---

3,183,795
BRAKE CYLINDER ASSEMBLY
Walter B. Kirk, Pitcairn, Pa., assignor to Westinghouse Air Brake Company, Wilmerding, Pa., a corporation of Pennsylvania
Filed Dec. 24, 1962, Ser. No. 246,801
8 Claims. (Cl. 92—212)

This invention relates generally to brake cylinder assemblies and more particularly to bearing means for resiliently supporting the piston in a brake cylinder.

In brake cylinders, as in cylinders in general, the piston is necessarily slightly smaller in diameter than the cylinder bore to permit insertion of the piston in the bore during assembly and to permit free reciprocal movement of the piston in the cylinder during operation of the cylinder assembly. In order to provide a pressure chamber in the cylinder bore, an effective seal is provided between the piston and the bore by a variety of means such as piston rings or, preferably, flexible packing means carried by the piston. These sealing means are effective and adequate, however, because of the space between the piston itself and the cylinder bore, and because brake cylinder assemblies are usually installed with the brake cylinder disposed with its axis parallel to gravitational force, shock due to vibration of the brake cylinder assembly caused by movement of the rail car results in a hammering action between the piston and the cylinder wall, thus causing continual wear even when the cylinder assembly itself is not in operation.

It is the prime object of this invention to decrease production costs and eliminate wear due to hammering action between the piston and the cylinder wall of a brake cylinder assembly by providing on the perimeter of the piston a resilient support for the piston in the cylinder and for providing a slide bearing surface between the piston and the cylinder. Specifically, this object is achieved by cutting the piston undersized, thus eliminating the cost of precision machining otherwise necessary for a close fit, and providing on the perimeter of the piston a bearing in the form of an annular resilient member comprising a pair of interconnected, concentric rings providing the bearing with a U-shaped cross section wherein the legs of the U-shape correspond to the concentric rings, the inner one of the concentric rings engaging the piston perimeter and the outer ring engaging the cylinder wall. The rings are resiliently spaced by means of integral web means or ribs, the individual ribs being equi-spaced from each other at a predetermined distance, depending upon the weight of the cylinder to be supported thereby, thus providing any appropriate resiliency. The bearing means is comprised of resilient material, preferably of the self-lubricating type, such as polyethylene, which material is commercially well known and heretofore used as self-lubricating bearings generally, in a wide variety of devices.

Other objects and advantages of the invention will appear from the following description of a preferred embodiment of the invention.

In the drawing:

FIG. 2 is a front elevational view of the piston bearing means shown in FIG. 1; and FIG. 3 is a side elevational view of the piston bearing means of FIG. 2.

Figure 1:
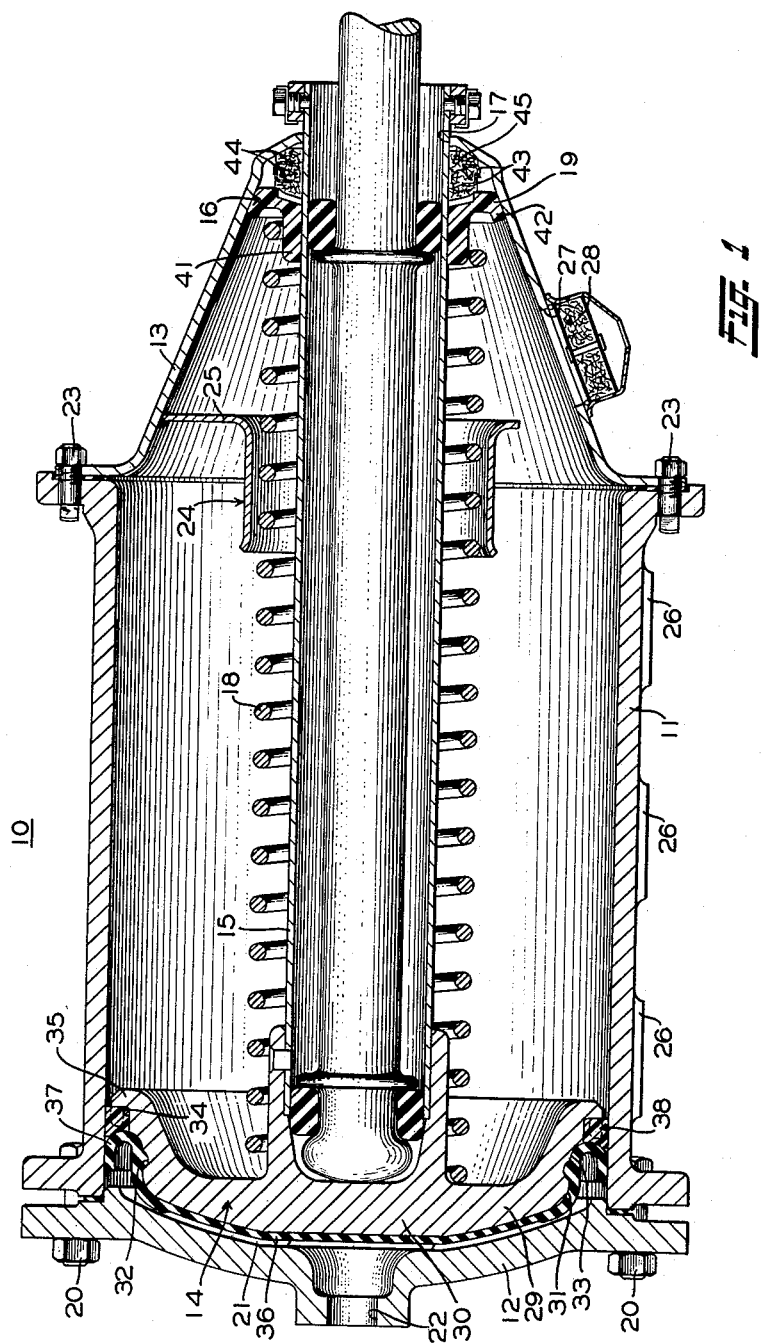
FIG. 1 is a sectional view of a brake cylinder showing the invention.

Referring now to FIG. 1 of the drawing, there is shown a brake cylinder device 10 comprising a hollow, relatively thin-walled tubular casing 11, the bore at one end of which is closed by an integral pressure head 12. A non-pressure head 13 is removably secured to the casing 11 over the opposite end of the bore, and reciprocably mounted in the bore is a brake cylinder piston 14 having a hollow piston rod 15 attached thereto in a conventional manner and slidably mounted in a combined piston rod support means and spring seat 16 provided internally and centrally of the non-pressure head 13, said piston rod 15 extending externally of the cylinder 10 through an aperture 17 in the non-pressure head 13. A release spring 18 encircling the rod 15 bears at one end on the annular spring seat portion 19 of combined spring seat and piston rod support 16 and at the opposite end on the piston 14 for urging said piston to its brake release position engaging the pressure head 12, as shown in FIG. 1.

The pressure head 12 is attached to the casing 11 by bolts 20 forming a pressure chamber 21 between the piston 14 and pressure head 12. An aperture 22 is provided in head 12 for connection to a pipe (not shown) through which fluid under pressure is applied to and released from the chamber 21 in the usual manner for controlling the brakes on a vehicle.

The non-pressure head 13 is attached to the casing 11 by means of bolts 23, and serves also as a support means for a tubular spring support 24 surrounding the spring 18 and having radial leg members 25 attached directly to the inside walls of the non-pressure head 13 as by welding.

In order to mount the cylinder device upon any desired part of the car, there are provided a plurality of integral bolting flanges 26 conveniently disposed on the outside of the cylinder, in the usual manner.

In the one side of the non-pressure head there is provided an aperture 27 to permit free passage of air into and out of the non-pressure chamber. There is secured to the outside of the casing 11 a conventional air strainer 28 covering the aperture 27 to prohibit dirt from entering the cylinder 11. The details of the strainer are well known, and accordingly will not be described herein.

The brake piston 14 comprises an imperforate head portion 29 pressed into a cup having substantially a configuration conforming to the contour of the inside of pressure head 12. The central portion 30 of piston head 14 merges into a cylindrical portion or shoulder 31 having an annular recess 32 thereon. The shoulder portion 31 merges into a flared portion 33, which, in turn, merges into a cylindrical portion or shoulder 34. The shoulder 34 merges into a radially extending flared portion 35, which portion comprising the largest diametrical portion of the piston head 14, the diameter of which portion is substantially less than that of the bore in cylinder 11 to provide sufficient space between the piston and the wall of the cylinder for mounting the bearing on the piston 14, as hereinafter described.

In order to provide a seal between the cylinder wall 11 and the piston head 14, there is provided a packing cup 36 which is disposed upon and completely covers the central portion 30 of the piston head 14, the packing cup having an outer portion 37 being U-shaped in contour, with the inner leg thereof merging with the main body of the packing cup and with the outer leg of said U-shaped member slidably engaging the inner wall of the casing 11 for preventing leakage of fluid under pressure past the piston 14. An integral annular bead is formed on the inner leg of the U-shaped portion 37 of packing cup 36 and is contracted into the hereinbefore-described annular recess 32 on the piston head 14 for holding the packing cup 36 in place thereon.

In accordance with the present invention, a resilient bearing or support ring, shown generally at 38 in FIG. 1, and shown in more detail in FIGS. 2 and 3, is carried by the piston 14 to support the piston head 14 within the cylinder 11 to eliminate hammering of the piston 14 in the bore of cylinder 11 as caused by vibration or shock during motion of the rail car.

The bearing 38 is annular in general form and comprises a pair of concentric ring members 39, 40 joined at one side by an integral radial member 41, thus providing the ring 38 with a U-shaped cross section wherein the ring members 39, 40 comprise the legs of the U-shaped cross section and wherein the ring 41 comprises the bight portion connecting the legs. The ring 38 is comprised of resilient material, preferably of the well-known commercially available polyethylene materials, the U-shaped structure of the resilient material providing for resilient yielding of the two legs 39, 40 toward each other to provide resilient support for the piston head 14 when the ring 38 is installed on the piston head 14 at its outer periphery in the manner disclosed in FIG. 1, and, at the same time, constitutes a slide bearing for the piston 14.

In order to initially provide the amount of resiliency desired between the two rings 39, 40, a plurality of web members 42, integral with the ring 38, are disposed between the rings 39, 40 in predetermined equal, spaced relationship, the spacing between the web members being determined at the time of production to provide the desired resiliency between the rings 39, 40, depending upon the weight of the particular piston head.

In order to adapt the bearing 38 to be carried by the piston 12, the bight portion 41 of the inner ring 40 may be curved on its outer surface at 43 to merge with the hereinbefore-described flared portion 33 of piston head 14 so that when the ring 38 is disposed upon the piston 14 with the inner ring 40 tightly pressed against the cylindrical portion 34 of the piston head 14, arcuate portion 43 merges with portion 33 of the piston head to comprise a composite arc serving as a backer for the previously-described U-shaped end portion 37 of packing cup 36. It is seen in FIG. 1 that the distance between the outer portion of the legs 39, 40 is greater than the length of the skirt 35 so that as the bearing ring 38 bears upon the cylindrical walls 11, the piston head 14 is prevented from engaging the cylindrical wall at any time and is thus resiliently mounted to prevent hammering action between the piston head 14 and the cylinder 11. At the same time, the self-lubricating characteristics of the bearing ring 38 reduce friction between the ring itself and the cylinder wall. It is seen that when the bearing 38 is installed upon the piston head 12, the skirt 35 and the portion 37 of packing cup 36 provide right and left limits, respectively, for fixing the bearing 38 axially on the piston head 14.

In order to prolong the life of the packing cup 36, lubrication of the outer leg of the U-shaped end of the packing cup may be provided by means of a semi-permanent type of lubricant, such as molybdenum disulfide, which, because of its characteristics of congealing into a semi-hard coating, may be sprayed onto the inside of the cylinder wall 11 at the time of assembly to thus provide, for an extended period of time, a satisfactory lubrication system. The sprayed-on lubricant eliminates the conventional oil soaked felt ring usually found on this type of device as carried by the piston head to engage the wall and distribute lubricant thereon.

The previously-described spring seat 16 is comprised preferably of the same self-lubricating material as the previously-described bearing ring 38, and is comprised of a tubular member 41 providing a slide bearing surface for the piston rod 15, integral radial spring seat member 19 having a peripheral skirt 42 engageable with the non-pressure head 13 so that the pressure exerted by the spring 18 will hold the seat 16 in the position shown in FIG. 1.

The piston rod 15 may be provided with a coating of the same construction material as the spring seat 16, to thus eliminate friction or a scouring action between the spring seat 16 and the piston rod 15.

In order to apply lubricant to the piston rod 15 and to prevent entry of dirt, grit and the like into the cylinder 11 through aperture 17, there is disposed between the seat 16 and the aperture 17 in the cylinder 11 a pair of adjacent ring members 43, 43 surrounding the piston rod 15, and each having inwardly projecting portions 44, 44 embedded in a felt ring or swab 45 surrounding the piston rod 15 and engaged therewith. Lubrication may be periodically applied to the felt swab, as desired.

It is to be observed that the felt ring 45 is firmly fitted between the seat 16 and the end of the non-pressure head, and yet the engagement of the seat 16 with the cylinder 11 prevents excessive lateral pressure from being applied upon the felt seal.

Having now described the invention, what I claim as new and desire to secure by Letters Patent is:

1. In combination, a cylinder having a bore therein, a piston reciprocably movable in said bore and having a radially extending skirt thereon, said skirt having its largest diameter smaller than said bore providing a space between said skirt and said bore, a packing cup carried by said piston and extending radially therefrom in engagement with said bore to effect a seal between said bore and said piston, annular resilient bearing means carried peripherally by said piston and axially supported between and by the skirt and the packing cup, said resilient bearing means having an outside diameter substantially the same size as said bore to resiliently space said piston from said bore to prevent the piston from hammering against the cylinder in response to road shock applied to the cylinder when carried in transit by a rail car.

2. The combination of claim 1 in which said bearing means is comprised of polyethylene.

3. The combination of claim 1 in which said bearing means comprises a pair of concentric ring members connected by an integral radial member effecting a U-shaped cross section, the bearing means being disposed on said piston with the inner ring of said ring pair peripherally engaging the piston and with the outer ring of the said ring pair peripherally engaging the bore wherein the ring members may be resiliently stressed toward each other by shock force applied to the cylinder.

4. The combination of claim 3 in which said bearing means further includes web members radially disposed between said ring members in predetermined circumferentially spaced relationship to provide the desired resiliency between the concentric rings.

5. The combination of claim 4 in which said web members are integral with the concentric rings.

6. The combination of claim 5 in which said bearing member is comprised of polyethylene.

7. A resilient bearing member for disposition upon a piston to prevent hammering action between the piston and the bore of a cylinder in which the piston is disposed, comprising a pair of flat concentrically spaced resilient ring members, a radially disposed resilient member connecting said rings at one edge whereby the ring members may be resiliently urged toward one another when the inner ring is disposed upon a piston with the outer ring peripherally engaging the bore of the cylinder and with the inner ring peripherally engaging the cylinder.

8. The bearing member of claim 7 in which the rings thereof are interconnected periodically circumferentially by means of a plurality of radially disposed spaced web members to effect a predetermined resiliency depending upon the spacing between the web members.

References Cited by the Examiner

UNITED STATES PATENTS

| | | | |
|---|---|---|---|
| 2,573,384 | 10/51 | Bent | 92—130 |
| 2,083,686 | 6/57 | Campbell | 92—130 |
| 2,928,379 | 3/60 | Preciado | 92—168 |
| 3,039,834 | 6/62 | Howe | 308—4 |
| 3,046,062 | 7/62 | Wettstein | 308—4 |

RICHARD B. WILKINSON, *Primary Examiner.*

UNITED STATES PATENT OFFICE
CERTIFICATE OF CORRECTION

Patent No. 3,183,795                              May 18, 1965

Walter B. Kirk

It is hereby certified that error appears in the above numbered patent requiring correction and that the said Letters Patent should read as corrected below.

Column 4, line 57, after "cylinder" insert a period; lines 57 and 58, strike out "and with the inner ring peripherally engaging the cylinder.".

Signed and sealed this 15th day of March 1966.

(SEAL)
Attest:

ERNEST W. SWIDER                           EDWARD J. BRENNER
Attesting Officer                                 Commissioner of Patents